May 31, 1938. W. G. CHRYST 2,119,098
CLUTCH MECHANISM FOR WHEEL DIFFERENTIALS
Filed May 21, 1937 2 Sheets-Sheet 2
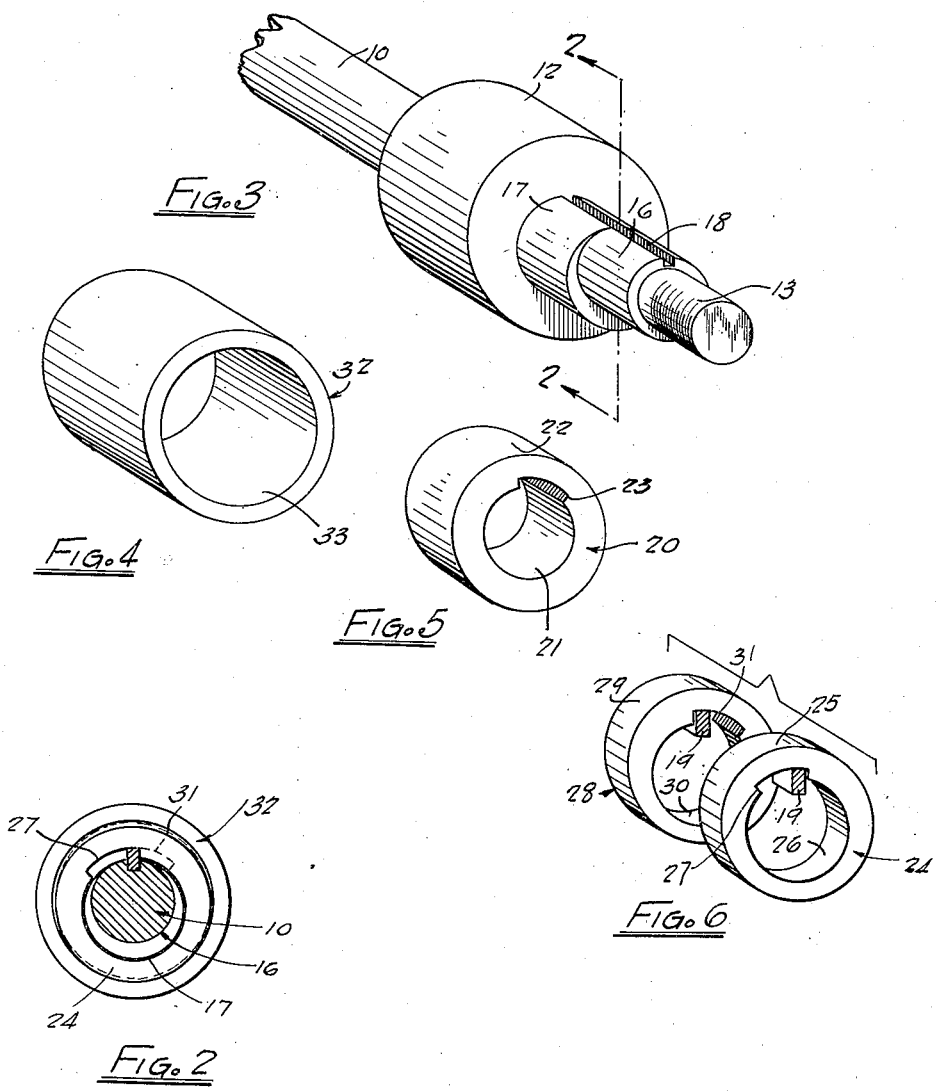
INVENTOR.
WILLIAM G. CHRYST
BY Joshua R H Hopts
ATTORNEY.

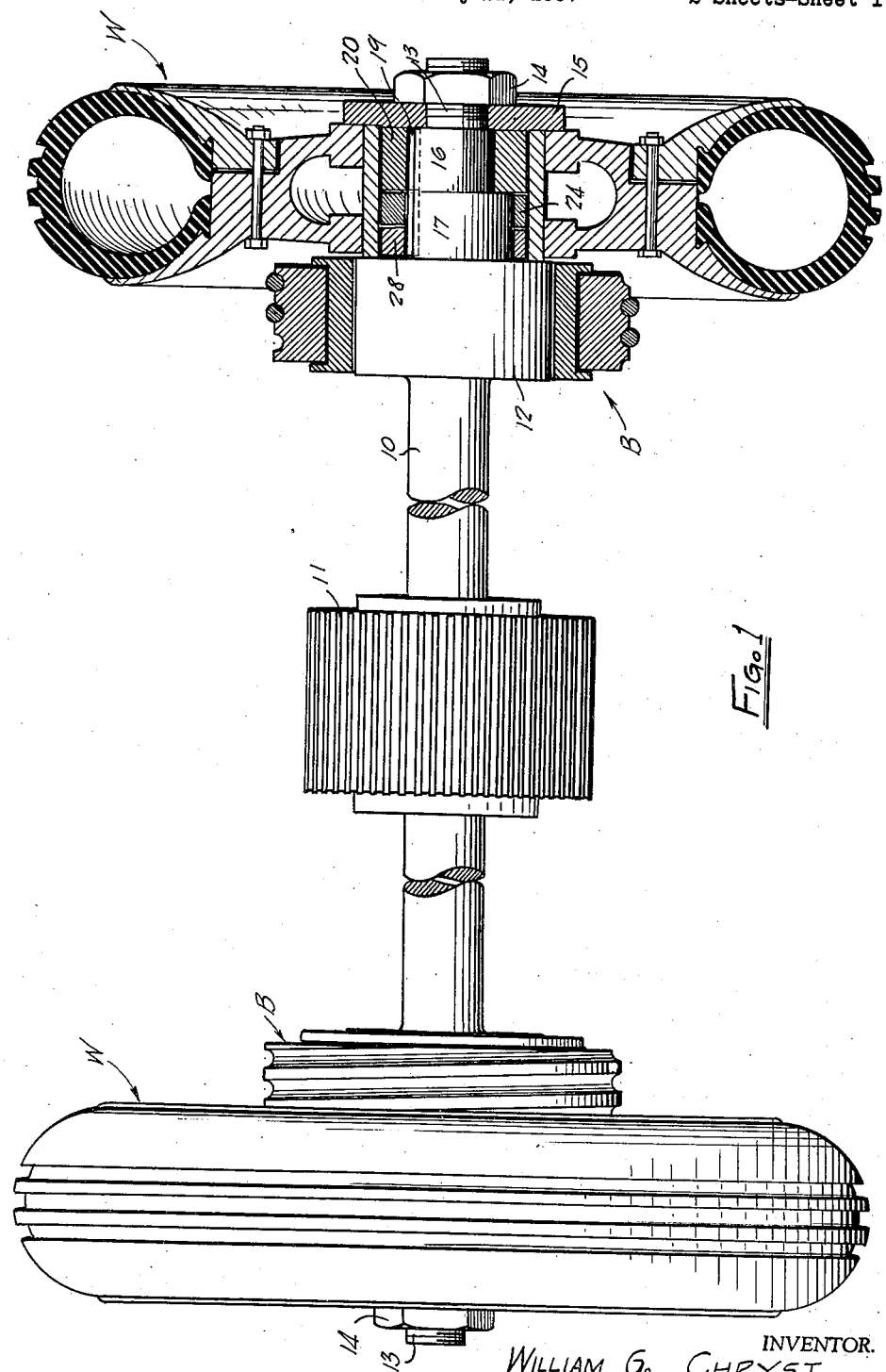

Patented May 31, 1938

2,119,098

UNITED STATES PATENT OFFICE 2,119,098

CLUTCH MECHANISM FOR WHEEL DIFFERENTIALS

William G. Chryst, Philadelphia, Pa.

Application May 21, 1937, Serial No. 143,928

3 Claims. (Cl. 192—43)

This invention has to do with wheel differentials which are commonly employed in conjunction with power driven wheels for the purpose of permitting the driven wheel on one side of a vehicle traveling a greater distance than the corresponding driven wheel on the other side of the wheel, as when the vehicle makes a turn.

The use of the well-known differential gear throughout the automotive field in the rear axle of the usual motor vehicle is now widespread, and is generally characterized by the presence of two individual axle members, one being attached to the wheel on each side of the car. The inner extremities of these half axles are spaced apart, and carry bevel gears between which mesh complemental rolling bevel gears in a well-known manner. These intermediate bevel gears are carried by a housing which is driven by the engine of the vehicle through appropriate driving connections.

It is evident that a rear axle differential of this type is characterized by the independence of the axles for the wheel on each side. Moreover, when the axle on one side is held stationary it constitutes a backing for the rolling bevel gears for driving the axle on the other side at an increased rate of speed. Thus, if an automobile is stalled in the mud under conditions in which one wheel has better traction than the other, the wheel which has the better traction remains stationary, while the wheel on the other side of the car spins at a high rate of speed, due to the conditions of the lack of traction and the mode of operation of the wheel differential.

With the foregoing conditions in mind this invention has in view as its primal objective the provision of a wheel differential designed for use in conjunction with motor vehicles, steam and electric locomotives, and similar power driven apparatus in which the driving wheels at each side of the vehicle are connected by a single unitary driven axle, while at the same time provision is made for causing the wheel at one end of the axle to rotate at a higher rate of speed than the wheel on the other end of the axle, as when the vehicle on which the wheels are mounted makes a turn.

In carrying out this idea in a practical embodiment, the single unitary axle is driven from the power plant of the vehicle by appropriate driving connections, and the wheels which are mounted on each end of the driven axle are carried by the axle in such a manner as to be drivably connected with the axle when power is to be transmitted from the axle to the wheels. However, each of the wheels is permitted to overrun the axle, as when the outside wheel is making a turn, and moves at a higher rate of speed than the inside wheel; the speed of the latter being controlled by the driven axle.

Yet another more detailed object of the present invention is the provision of instrumentalities for mounting a wheel on an axle in accordance with the above noted objectives.

A wheel differential made in accordance with the above noted principle presents the advantage of having any braking effects which may be applied at any point in the axle transmitted to both of the wheels. It is evident that if a brake is located at each end of the axle in close juxta-position to each of the wheels in a conventional manner the braking effects which are applied to the axle will be the sum total supplied by each of the brakes, which is a condition impossible of attainment in the now-known differential in which the axles for the wheel on each side are independent.

Moreover, while the wheels on each end of the axle are permitted to overrun the axle, when power is applied to the axle it is effective to cause rotation of both of the wheels at the minimum rate of speed as determined by the speed of the axle.

Various other more detailed objects and advantages will in part become apparent, and in part be hereinafter stated, as the description of the invention proceeds.

The invention, therefore, comprises a wheel differential consisting of an axle carrying a wheel at each end thereof, which wheel is to be driven by the axle. Each of the wheels is mounted on the axle in such a manner as to be in a driving relationship therewith when power is to be transmitted from the axle to the wheel. However, this driving relationship may be broken when the speed of the wheel exceeds the speed of rotation of the axle, thus permitting of an overrunning of the wheel with respect to the axle. An important phase of the invention is the particular instrumentalities employed in establishing this relationship between the wheels and axle.

For a full and more complete understanding of the invention reference may be had to the following description and accompanying drawings, wherein Figure 1 is a view of an axle on which a pair of wheels are mounted in accordance with the precepts of this invention. In this view parts of the axle are broken away, to permit of an enlarged showing of the other parts, and the wheel and associated mechanism on one end of the axle are shown in section.

Figure 2 is a transverse section taken through the axle about on the plane represented by the line 2—2 of Figure 3. In this view certain of the instrumentalities carried by the axle are shown in elevation, Figure 3 is an enlarged detailed view in perspective of one end of the axle, Figure 4 is a similar perspective showing of the sleeve which constitutes the hub of the wheel, Figure 5 is another perspective showing of a collar which is carried by the concentric surface, and Figure 6 is still another perspective view bringing out the eccentric collars which are carried on the eccentric surface.

Referring now to the drawings, wherein like reference characters denote corresponding parts, an axle is shown at 10, and is intended to represent any axle to which power is applied for the purpose of imparting power to wheels which are in turn carried by the axle. As shown in Figure 1, the axle 10 intermediate its extremities may carry a gear 11 for the purpose of imparting power to the axle 10. At this point it is well to note that while the axle 10 may be of a sectional construction prior to assembly with the gear 11, when these parts are assembled it is a single unitary piece for all functional purposes.

At each end of the axle 10 is mounted a wheel assembly referred to generally by the reference character W, and as the wheel assemblies at each end are of duplicate construction, as well as the manner of mounting the same on the axle 10, the construction at only one end of this shaft will be described, as this suffices for the purposes of this specification.

Referring now more particularly to Figures 1 and 3, the axle 10 is shown as formed with an enlarged cylindrical portion 12 which is spaced inwardly from the extremity of the shaft a considerable distance, and disposed about this cylindrical portion 12 are braking instrumentalities which are referred to in their entirety by the reference character B. Inasmuch as this invention is not concerned with the particular type of braking mechanism employed, these instrumentalities are not here described in detail, but they will have the function when applied of applying braking effects to the axle 10.

The extremity of the axle 10 is reduced in diameter and threaded, as indicated at 13, and screwed on this threaded portion is a nut 14 which may engage against a washer 15 also carried on the reduced portion 13, for the purpose of maintaining the wheel W and associated mechanism assembled on the axle.

Adjacent the reduced portion 13 the axle 10 is formed with a cylindrical surface 16 that is coaxial with the axle 10. Between the cylindrical surface 16 and the enlarged portion 12 the axle 10 is formed with a cylindrical surface 17 that is eccentrically disposed to the axis of the shaft 10. Speaking with reference to the showing of Figures 1 and 3 it will be noted that the upper portions of the cylindrical surfaces 16 and 17 are in substantial alignment, and this aligned portion is formed with a keyway designated 18 in which is received a key 19 that may be held in this keyway in any well-known manner.

A collar 20 having an inner cylindrical surface 21 and an outer cylindrical surface 22 is disposed about the cylindrical surface 16, with the bore 21 of the collar snugly receiving this surface 16. This bore 21 of the collar 20 is cut away, as shown at 23, to provide a space for receiving the key 19, and when the various parts are in a so-called neutral position the key 19 will be disposed in a central position in the recess 23.

Another collar 24 is formed with an outer cylindrical surface 25 which has the same diametrical dimension as the outer cylindrical surface 22 of the collar 20, while the inner cylindrical surface of the collar 24 is formed with a cylindrical surface 26 intended to receive the cylindrical surface 17. It will be noted that the inner cylindrical surface 26 is eccentric with respect to the outer cylindrical surface 25.

The collar 24 is formed with a recess 27 corresponding to the recess 23 in the collar 20, and which recess opens into the bore 26. When this collar 24 is assembled on the surface 17 with its outer cylindrical surface 25 in substantial alignment with the cylindrical surface 22 of the collar 20 the key 19 will assume the position shown in Figure 6, in which it is disposed at one side of the recess 27, leaving the remainder of the recess as an open space on one side of the key 19.

Another collar 28 is also formed with an outer cylindrical surface 29 corresponding to the cylindrical surfaces 22 and 25 of the collars 20 and 24 respectively, and an inner cylindrical surface 30 which is eccentric to the outer surface 29, and which is designed to receive the surface 17 of the axle 10. The collar 28 is formed with a recess 31 opening into the bore 30, and when the collar 28 is assembled on the surface 17 with the cylindrical surface 29 in substantial alignment with the cylindrical surfaces 25 and 22 the key 19 is disposed at one side of the recess 31, with the remainder of this recess present as an open space on the side of the key 19 opposite from the location of the open space which is defined by the recess 27 of the collar 24.

Fitted about the collars 22, 24 and 28 is a sleeve 32, which constitutes the hub of the wheel assembly W. This sleeve 32 has an inner cylindrical surface 33 which is designed to snugly receive the cylindrical surfaces 22, 25 and 29 on the collars 20, 24 and 28 respectively, and when the cylindrical surfaces 22, 25 and 29 are in alignment the sleeve 32 is intended to be rotatable thereabout.

However, when either of the cylindrical surfaces 25 and 29 come out of this alignment, in a manner to be hereinafter described, they are intended to establish a bond or freeze with the inner cylindrical surface 33 of the sleeve 32 to establish the driving relationship.

The particular construction of the wheel W, which is carried on the sleeve 32 with the latter functioning as a hub, does not particularly enter into the present invention, and is, therefore, not here described in detail, as the invention is intended to be used with any type of wheel which is mounted on this sleeve 32.

When power is applied to the axle 10 through the gear 11 the eccentric surface 17 is turned within the bores 26 and 30, thus urging one of the collars 24 or 28 outwardly to effect a freeze or bond with the inner surface 33 of the sleeve 32. It will be noted, however, that the turning movement of the axle 10 with respect to the collars 24 and 28 is limited by an engagement of the key 19 with the edges of the recesses 27 or 31. When the axle turns in one direction, one of the collars 24 or 28 will rotate therewith due to the engagement of the key with an edge of one of the recesses 27 or 31. At the same time relative movement between the other of the collars 24 and 28 and the surface 17 of the axle 10 takes place to cause a camming action which establishes a bond with the sleeve 32. With one of the collars 24 or 28 frozen to the sleeve 32 a driving relationship between the axle 10 and wheel W is established, and power is transmitted from the axle 10 to this wheel W.

However, should the vehicle on which the axle 10 is mounted round a curve, the wheel W on the outside will have to rotate at an increased rate of speed which is imparted thereto by the speed of the vehicle, and the engagement of the wheel with the vehicle on which it is operated. As the speed of rotation of the wheel overruns that of the axle 10 the sleeve 32 will move the collars 24 and 28 in a reverse direction with respect to the eccentric surface 17, so as to break the freeze. Thus the wheel will be permitted to freely overrun the axle.

With the foregoing arrangement it is evident that when the axle 10 is driven each of the wheels W on each end thereof must rotate at a rate of speed at least as great as the speed at which the axle 10 is driven, and a condition in which one wheel remains stationary and the other runs at a high rate of speed is thus entirely avoided.

It is noted with the vehicle on which the axle 10 is mounted at a standstill, the surface 17 at each end of the axle will be in a so-called neutral position with respect to the collars 24 and 28.

In this position the key 19 will be in engagement with one edge of the notch 27 in the collar 24, and at the same time be in engagement with the correspondingly opposite edge of the recess 31 in the collar 28. Upon driving power being imparted to the axle 10 to rotate same in a direction to cause forward motion of the vehicle, the key 19 being in engagement with the edge of the recess 27 causes the collar 24 to rotate therewith, and the relative neutral position of this collar with respect to the sleeve 32 is maintained; that is there is a rotatable relationship between the collar 24 and the sleeve 32. However, due to the fact that the key 19 may move in the recess 31 of the collar 28, there is relative movement between this collar and the eccentric surface 17 of the axle 10. This relative movement causes a camming action which urges the collar 28 out of its neutral position into engagement with the bore of the sleeve 32 to freeze the same thereto and thus establish a bond which is the driving connection from the axle 10 through the collar 28 and sleeve 32 to the wheels W.

Consider now the situation when the vehicle is making a turn. As power has continued to be applied to the axle 10, the wheels of both sides of the vehicle must rotate at a certain minimum speed determined by this driving power. However, due to the rounding of a bend, a swinging motion is imparted to the axle 10 and as the wheel W on the outer side is in engagement with the traction surface this wheel will cover more ground and, therefore, rotate faster than the wheel on the inner side of the turn. Thus the speed of rotation of the wheel W on the outside is greater than the speed of the rotation of the axle 10. As the collar 32 of the wheel on the outer side moves faster than the axle 10, there is a relative movement between the bore of the sleeve 32 and the outer cylindrical surface of the collar 28, which is effective to break the bond and permit the overrunning.

Consider now the effects of applying the brake B to slow down rotation of the axle 10 to completely stop this rotation. The forward motion of the vehicle will cause continued rotation of the wheels W and the initial effect of this rotation will be to cause a turning of the collar 28, and due to the presence of the recess 31, this relative movement between this collar 28 and the surface 17 of the axle is permitted.

At the same time that the key 19 moves in the recess 31 of the collar 28 it also moves in the recess 27 of the collar 24, thus establishing a bond between the collar 24 and the sleeve 32 to cause the wheels W to rotate at the same speed as the axle 10, and if this speed is reduced to zero, then the rotation of the wheels will have correspondingly been reduced to zero and the vehicle brought to a stop.

Moreover, the braking effects which are applied to the wheels W will be the sum total of the braking effects applied by both of the brake assemblies B. Due to the conventional practice in the automotive field the invention is illustrated with the brake B located on the axle adjacent each of the wheels W. However, a single brake on the axle 10 would effectively brake both of the wheels W.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. In a wheel differential including a single unitary axle and a wheel carried by the axle at each end thereof, clutch mechanism for establishing a driving connection between the axle and one of the wheels comprising a surface on the axle coaxial therewith, another surface adjacent to the first mentioned surface but eccentric with respect to the axis of the axle, cylindrical collars carried by said surfaces, certain of said collars being formed with bores eccentric to the outer cylindrical surface thereof, and which bores receive the said eccentric surface, and a sleeve disposed about said collars and constituting the hub of the wheel.

2. In a wheel differential including a single unitary axle and a wheel carried by the axle at each end thereof, clutch mechanism for establishing a driving connection between the axle and one of the wheels comprising a cylindrical surface formed on the axle and coaxial therewith, a second cylindrical surface formed on the axle adjacent to the first cylindrical surface but eccentric to said first cylindrical surface, said cylindrical surfaces having portions in alignment, and which aligned portions are formed with a keyway, a key in said keyway, a collar carried by said first mentioned cylindrical surface and formed with a recess for receiving said key, said collar having an outer cylindrical surface, a pair of collars having an outer cylindrical surface of the same diametrical dimension as the outer cylindrical surface on said first mentioned collar and formed with bores eccentric to said outer cylindrical surface, said bores receiving the eccentric cylindrical surface on the axle, each of said last mentioned collars being formed with a recess for receiving said key, and a sleeve fitted about the outer cylindrical surfaces of said collars and constituting the hub of the wheel which is mounted on the axle by these said instrumentalities.

3. In a wheel differential including a single unitary axle and a wheel carried by the axle at each end thereof, clutch mechanism for establishing a driving connection between the axle and one of the wheels comprising a cylindrical surface formed on the axle and coaxial therewith, a second cylindrical surface formed on the axle adjacent to the first cylindrical surface but eccentric to the said first cylindrical surface, said cylindrical surfaces having portions in alignment, and which aligned portions are formed with a keyway, a key in said keyway, a collar carried by said first mentioned cylindrical surface and formed with a recess for receiving said key, said collar having an outer cylindrical surface, said recess providing a space on each side of said key, a second collar on the eccentric surface of the axle having an outer cylindrical bore of the same diametrical dimension as the first mentioned collar and formed with a bore eccentric to said outer cylindrical surface which receives said eccentric cylindrical surface of the axle, said collar being cut away to provide a recess for receiving said key, said recess providing an open space on one side of said key, a third collar having a cylindrical surface of the same diametrical dimensions as the first two collars, and having an inner bore eccentric to said outer cylindrical surface, said inner bore receiving the eccentric surface on the axle with the third collar being formed with a recess for receiving the key, and which recess provides an open space on the side of the key opposite the open space provided by the second collar, and a sleeve having an inner cylindrical surface receiving the outer cylindrical surfaces of said collars, said sleeve constituting the hub of the wheel which is mounted on the axle by said instrumentalities.

WILLIAM G. CHRYST.